United States Patent [19]

Marescot et al.

[11] Patent Number: 5,068,946
[45] Date of Patent: Dec. 3, 1991

[54] LOCKING HINGE ASSEMBLY FOR AN AIRCRAFT COWLING

[75] Inventors: Jean-Marc D. L. Marescot; Pascal-Marie P. M. Soulier, both of Le Havre, France

[73] Assignee: Societe anonyme dite Hispano-Suiza, Saint-Cloud, France

[21] Appl. No.: 526,723

[22] Filed: May 22, 1990

[30] Foreign Application Priority Data

Jun. 7, 1989 [FR] France .................... 89 07516

[51] Int. Cl.⁵ .......................................... E05D 11/10
[52] U.S. Cl. .............................. 16/333; 16/347; 16/371; 292/DIG. 31; 292/DIG. 49; 244/129.4
[58] Field of Search ............... 16/231, 319, 333, 346, 16/371, 343, 321, 347, 368, 370; 292/113, DIG. 31, DIG. 49; 244/129.4

[56] References Cited

U.S. PATENT DOCUMENTS

| | | | |
|---|---|---|---|
| 2,224,825 | 12/1940 | Krakauer | 16/333 |
| 2,355,542 | 8/1944 | Loftin . | |
| 2,392,309 | 1/1946 | Burton | 16/333 |
| 3,541,794 | 11/1970 | Johnston et al. . | |
| 4,044,973 | 8/1977 | Moorehead . | |
| 4,083,082 | 4/1978 | Holmes . | |
| 4,585,189 | 4/1986 | Buxton . | |
| 4,679,750 | 7/1987 | Burhans | 292/DIG. 49 |
| 4,858,970 | 8/1989 | Tedesco | 292/DIG. 31 |

FOREIGN PATENT DOCUMENTS

| | | | |
|---|---|---|---|
| 1186362 | 1/1965 | Fed. Rep. of Germany | 16/346 |
| 2552536 | 5/1977 | Fed. Rep. of Germany . | |
| 2569756 | 3/1986 | France . | |
| 2087972 | 6/1982 | United Kingdom | 292/263 |
| 2171451 | 8/1986 | United Kingdom | 16/333 |
| 2214229 | 8/1989 | United Kingdom | 292/263 |

*Primary Examiner*—Richard K. Seidel
*Assistant Examiner*—Edward A. Brown
*Attorney, Agent, or Firm*—Bacon & Thomas

[57] ABSTRACT

The present invention relates to a locking hinge assembly for pivotally attaching a movable cowling panel to a stationary cowling portion in which the locking mechanism is incorporated into the hinge assembly. The hinge assembly includes pivoting links attaching the movable cowling panel to a stationary fitting member which, in turn, may be attached to the stationary cowling. The links, along with the stationary fitting member and the movable cowling panel form a quadrilateral with four pivot axes located at the apexes of the quadrilateral. The assembly includes a movable hook member mounted on the stationary fitting member such that it moves into engagement with a pivot shaft attaching one of the links to the movable cowling panel when the panel is in its closed position. A cam portion formed on one of the links contacts the hook member as the panel moves toward its closed position so as to move the hook member into engagement with the pivot shaft.

29 Claims, 5 Drawing Sheets

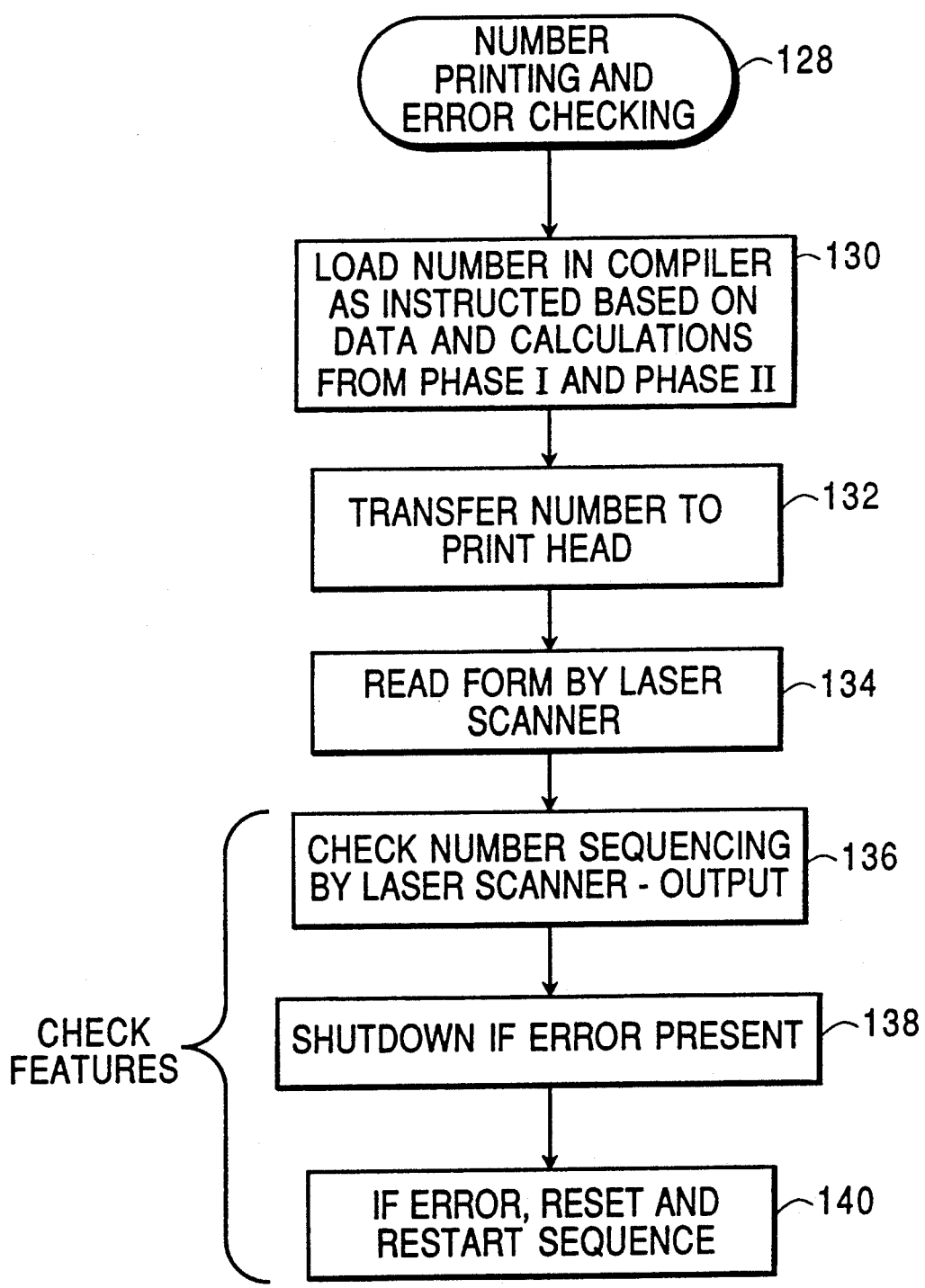

LOCKING HINGE ASSEMBLY FOR AN AIRCRAFT COWLING

BACKGROUND OF THE INVENTION

The present invention relates to a locking hinge assembly which pivotally supports a movable portion of an aircraft engine cowling. The assembly has means to lock the cowling in a closed position.

Aircraft engines are typically provided with an aerodynamic cowling to minimize the turbulence of the air passing around the engine structure. In the case of turbojet engines, the cowling may also define an air intake duct.

The known aircraft engine cowlings, usually include a fixed portion and one or more movable portions or panels which may be opened to gain access to the engine for maintenance purposes.

U.S. Pat. No. 4,585,189 to Buxton discloses an aircraft cowling incorporating a movable portion that is capable of opening by pivoting about a hinge axis. A power driven mechanism is connected to the movable cowling portions via a linkage mechanism to facilitate the opening of the cowl portions upwardly and downwardly.

It is also known to provide the movable cowling portions with locking means to ensure that they remain closed while the aircraft is operating. French Patent 2,569,756 discloses a cowling latching and locking mechanism utilizing an overcenter lever. U.S. Pat. Nos. 3,541,794 to Johnston et al. and 4,044,973 to Moorehead disclose aircraft engine cowlings having movable cowling portions or panels which pivot about a hinge attachment. The locking of these movable portions is achieved by locking devices located at positions located across the engine at diametrically opposite positions from the hinge axis.

SUMMARY OF THE INVENTION

The present invention relates to a locking hinge assembly for pivotally attaching a movable cowling panel to a stationary cowling portion in which the locking mechanism is incorporated into the hinge assembly. The hinge assembly includes pivoting links attaching the movable cowling panel to a stationary fitting member which, in turn, may be attached to the stationary cowling. The links, along with the stationary fitting member and the movable cowling panel form a quadrilateral with four pivot axes located at the apexes of the quadrilateral.

The assembly includes a movable hook member mounted on the stationary fitting member such that it moves into engagement with a pivot shaft attaching one of the links to the movable cowling panel when the panel is in its closed position. A cam portion formed on one of the links contacts the hook member as the panel moves toward its closed position so as to move the hook member into engagement with the pivot shaft. Thus, the assembly according to the present invention not only pivotally supports the movable cowling panel, but also includes means to lock it in the closed position.

The locking hinge assembly according to the invention permits a relatively wide opening angle of the movable cowling panel to provide easy access to the interior of the cowling. It also enables the movable cowling portion to withstand high internal pressures without opening. The hinge assembly is also remarkably compact and low in weight thereby increasing the efficiency of the airframe with which it is associated.

BRIEF DESCRIPTION OF THE DRAWINGS

FIG. 1a is a view similar to FIG. 1, but showing the movable cowling panel and the locking hinge assembly in their open positions.

DETAILED DESCRIPTION OF THE PREFERRED EMBODIMENT

Figure 1:
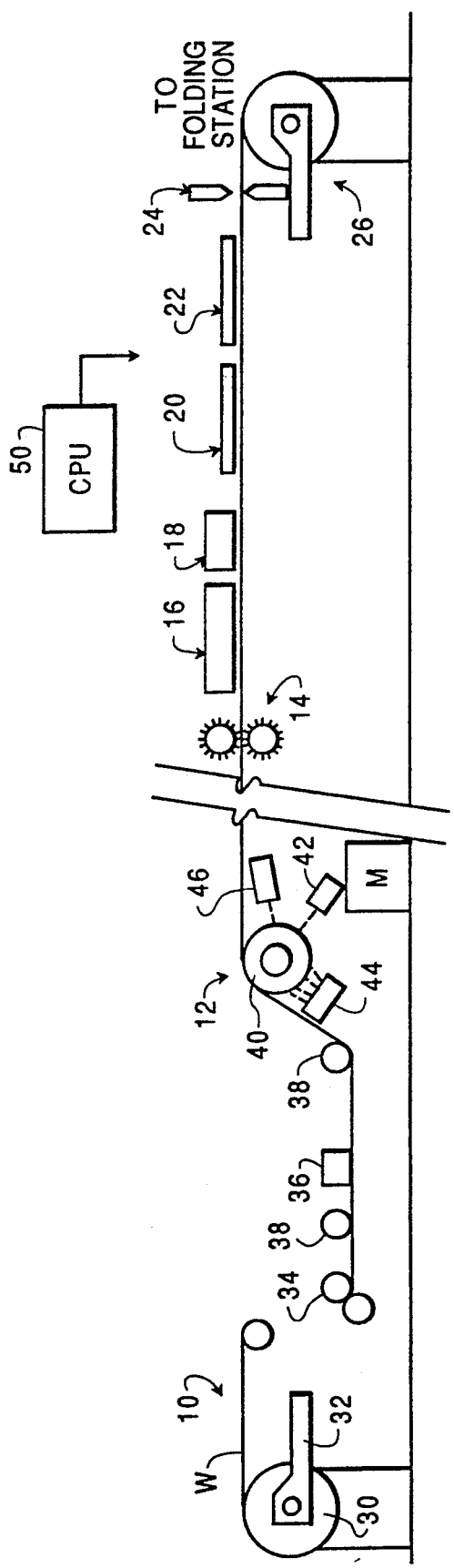
FIG. 1 is a partial, transverse cross sectional view of a movable cowling panel associated with the locking hinge assembly according to the invention in which the panel is in its closed position.

The movable cowling panel 1 forming a part of an aircraft engine cowling is schematically illustrated in FIGS. 1 and 1a in the closed and opened positions, respectively. The movable cowling panel 1 is movable between these positions by connection with known actuators, which may be of a mechanical, hydraulic or pneumatic type. Since these elements and their respective connections to the movable cowling panel are well known in the art, they have been omitted from FIGS. 1 and 1a.

Figure 2:
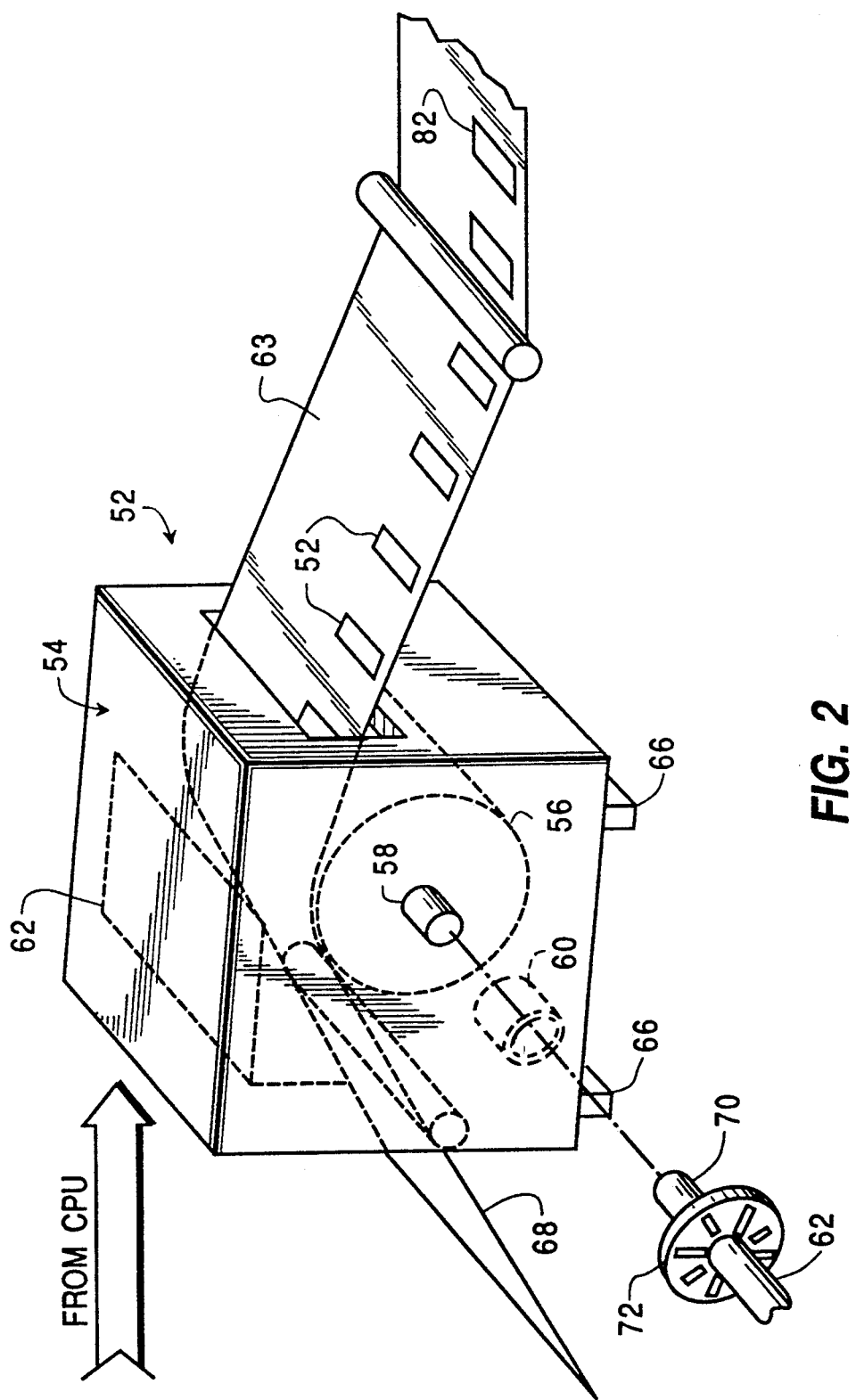
FIG. 2 is a perspective view of the locking hinge assembly according to the present invention in the open position.

The movable cowling panel 1 is supported by a locking hinge assembly 2 which, in turn, may be mounted to the engine mounting structure or to the stationary cowling portion (not shown). As shown in detail in FIG. 2, the hinge assembly 2 comprises a main or first link 4 having a first end 5 pivotally supported on a stationary fitting member 3 by a pivot shaft 6. The second end 7 of the main or first link 4 is pivotally attached to a clevis member 9 via a pivot shaft 8. Clevis 9 is fixedly attached to the movable cowling panel 1 by any known means.

The second end 7 of the first link 4 defines a cam portion 10 which extends beyond the pivot shaft 8. The function of the cam portion 10 will be described in further detail hereinafter.

Second links 13 have a first end 14 also pivotally attached to the stationary fitting member 3 via a pivot shaft 15. Second ends 12 of the links 13 are pivotally attached to the clevis member 9 via pivot shaft 11. Thus, as can be seen from FIG. 2, the links 4 and 13 along with the clevis member 9 and the stationary fitting member 3 form a quadrilateral with these elements as the sides and the pivoting axes of shafts 6, 8, 11 and 15 located at the apexes of the quadrilateral.

A stop 16 is located on the stationary fitting member 3 and acts as a limit to the motion of links 13 in their open positions.

The hinge assembly according to the invention also includes locking means to lock the hinge assembly when the movable cowling panel 1 is in its closed position. The locking means may comprise a hook member 17 pivotally attached to the stationary fitting member 3 via shaft 18. A guide ramp member 19 is located on the stationary fitting 3 and may be attached thereto by shafts 18 and 20.

Figure 3:
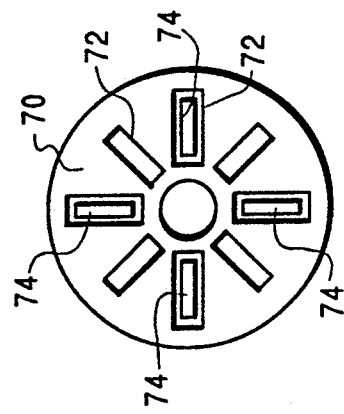

The operation of the hinge assembly according to the invention will now be described with particular reference to FIGS. 3-6. FIG. 3 illustrates the positions of the elements when the movable cowling panel 1 is in its closed and locked position. In this position, the hook member 17 is urged into engagement with the pivot shaft 11 such that the shaft 11 is retained in position between hook member 17 and the guide ramp member 19. The hook member 17 is maintained in this position by its contact with cam portion 10 formed as part of the main link 4. In this position, the movable cowling panel 1 is locked such that it may withstand high pressure on its interior wall generated while the aircraft is operational.

Figure 4:
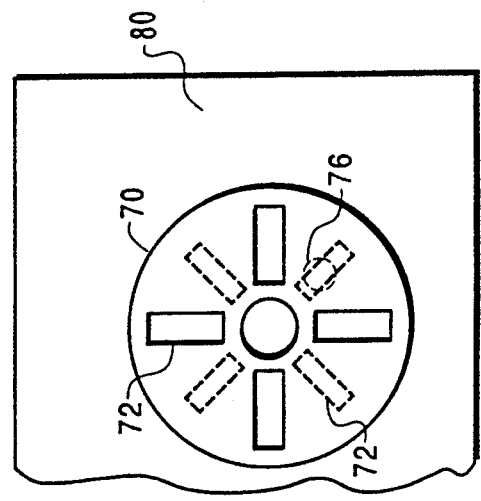
FIGS. 3-6 are partial, cross sectional views of the locking hinge assembly according to the invention as it moves from the closed position of FIG. 3 to the open position of FIG. 6.

As illustrated in FIG. 4, once the opening of the movable cowling portion 1 is initiated by the actuating mechanism (not shown), the links 13 move slightly in a clockwise direction about the pivot shaft 15, which movement urges the hook member 17 in a clockwise direction about its pivot shaft 18. This moves the hook member 17 out of engagement with the pivot shaft 11. Movement in the clockwise direction around pivot shaft 15 reaches its maximum when the axes of shafts 6, 8 and 11 lie along a straight line as illustrated in FIG. 4. Further movement of the movable cowling panel 1 causes links 13 as well as link 4 to move in a counterclockwise direction about their respective pivot shafts 15 and 6.

Figure 5:
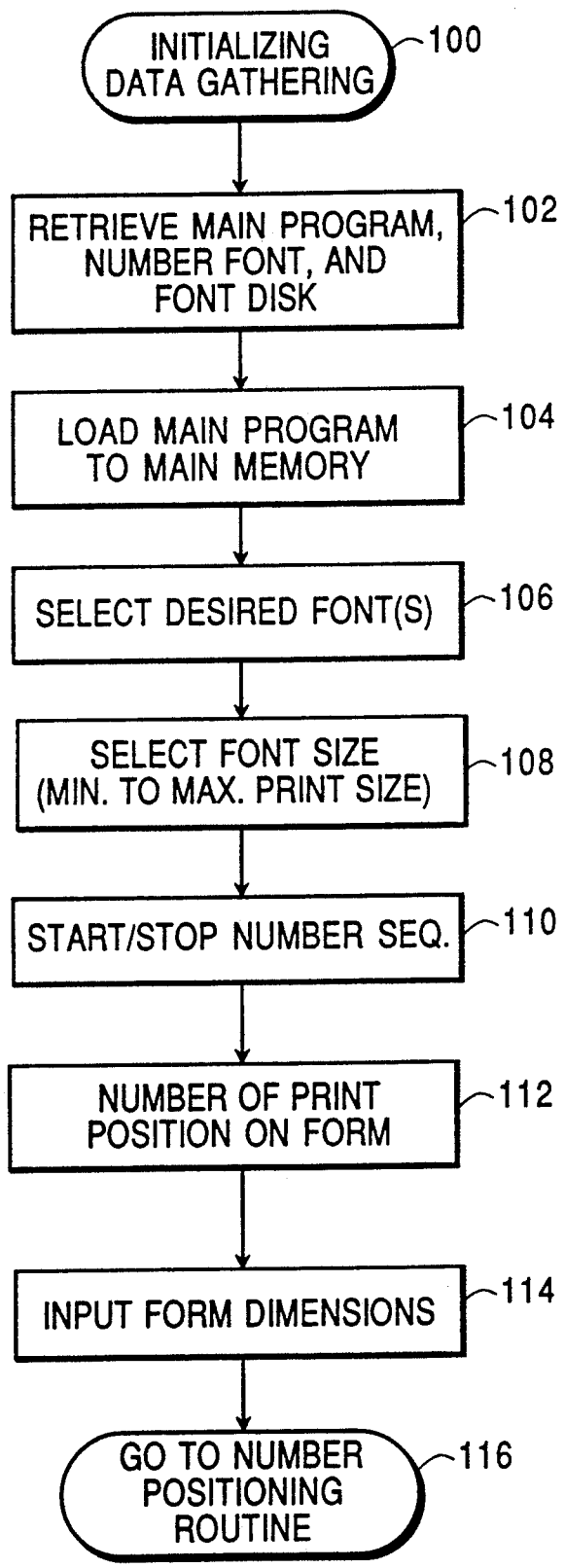

Further movement of the cowling panel 1 causes the elements to assume the positions shown in FIG. 5 in which the pivot shaft 11 has become totally disengaged from the hook member 17. When the movable cowling panel 1 has reached its opened position, the elements have reached the positions shown in FIG. 6. This occurs when the legs 13 engage the stop members 16 which limits their movement in a counterclockwise direction about the pivot shaft 15.

Figure 6:
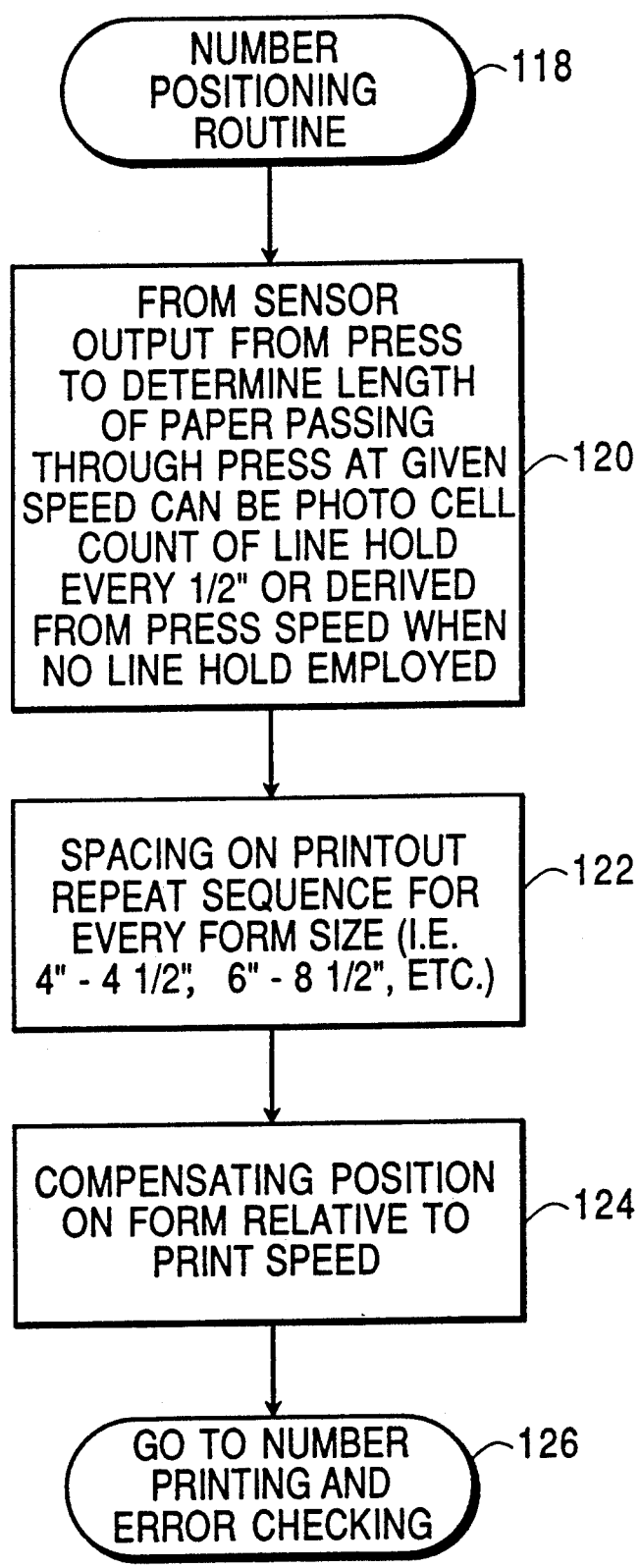

In the fully opened position as illustrated in FIG. 6, the angle of opening α of the movable cowl panel 1, illustrated in FIG. 1a, may be in excess of 100°, thereby providing good accessibility to the interior of the cowling.

The locking hinge assembly according to the invention provides a large angle of opening, while at the same time reduces the size and bulk of the hinge and locking assembly, especially in the radial direction, thereby providing a significant advantage over the known systems.

The closing and locking of the movable panel 1 moves the elements in the opposite directions i.e. from the positions shown in FIG. 6 to the positions shown in FIG. 3. Shaft 11 is guided into contact with the hook member 17 by the guide member 19, as illustrated in FIG. 4. At this point, cam element 10 contacts the hook member 17 such that further closing movement of the cowl panel 1 forces the hook member 17 into locking engagement with the pivot shaft 11, as illustrated in FIG. 3.

The basic structure as illustrated in the figures may be modified by providing a rotational shock absorbing damping device to the hook member 17, or by providing a spring biasing mechanism operatively engaged with the hook member 17.

Although the invention has been described for use in conjunction with an aircraft-type engine cowling, it is to be understood that it may be equally useful in pivotally supporting and locking any movable member to any stationary member.

The foregoing description has been provided for illustrative purposes only and should not be construed as in any way limiting this invention, the scope of which is defined solely by the appended claims.

What is claimed is:

1. A locking hinge assembly for pivotally attaching a movable member to a stationary member such that the movable member is movable between closed and open positions comprising:
   a) a stationary fitting member associated with the stationary member;
   b) a first link having a first end portion pivotally attached to the stationary fitting member so as to pivot about a first pivot axis, and a second end;
   c) a pair of second links, each second link having a first end portion pivotally attached to the stationary fitting member so as to pivot about a second pivot axis displaced from the first pivot axis, and a second end, wherein one second link is disposed on each side of the first link;
   d) means pivotally attaching the second ends of the first and the pair of second links to the movable member so as to pivot about third and fourth pivot axes, respectively, the links, the movable member and the stationary fitting forming a quadrilateral with the four pivot axes as apices; and,
   e) locking means operatively associated with the stationary fitting member and at least one of the links to lock the assembly in the closed position wherein the locking means comprises a hook member movably supported on the stationary fitting member.

2. The locking hinge assembly according to claim 1 further comprising damping means operatively associated with the hook member.

3. The locking hinge assembly according to claim 1 further comprising spring means operatively associated with the hook member.

4. The locking hinge assembly according to claim 1 wherein the means pivotally attaching the second ends of the pair of second links to the movable member comprises a pivot shaft.

5. The locking hinge assembly according to claim 4 wherein the hook member movably supported on the stationary fitting member is located so as to engage the pivot shaft and thereby retain the assembly in the closed position.

6. The locking hinge assembly according to claim 5 further comprising means to move the hook member into engagement with the pivot shaft as the assembly moves into the closed position.

7. The locking hinge assembly according to claim 6 wherein the means to move the hook member into engagement with the pivot shaft comprises a cam portion formed on the first link which contacts the hook member as the assembly moves into the closed position.

8. The locking hinge assembly according to claim 5 further comprising a guide ramp member located on the stationary fitting member and located so as to bear against the pivot shaft when engaged by the hook member.

9. The locking hinge assembly according to claim 1 further comprising a clevis member fixedly attached to the movable member and pivotally attached to the second ends of the first and the pair of second links.

10. The locking hinge assembly according to claim 1 further comprising stop means located on the stationary fitting member so as to limit the movement of the pair of second links in the open position.

11. A locking hinge assembly for pivotally attaching a movable member to a stationary member such that the movable member is movable between closed and open positions comprising:
 a) a stationary fitting member associated with the stationary member;
 b) a first link having a first end portion pivotally attached to the stationary fitting member so as to pivot about a first pivot axis and a second end;
 c) at least one second link having a first end portion pivotally attached to the stationary fitting member so as to pivot about a second pivot axis displaced from the first pivot axis, and a second end;
 d) a pivot shaft pivotally attaching the second ends of the first and the at least one second links to the movable member so as to pivot about third and fourth pivot axes, respectively, the links, the movable member and the stationary fitting forming a quadrilateral with the four pivot axes as apices; and,
 e) locking means operatively associated with the stationary fitting member and at least one of the links to lock the assembly in the closed position wherein the locking means comprises a hook member movably supported on the stationary fitting member located so as to engage the pivot shaft and thereby retain the assembly in the closed position.

12. The locking hinge assembly according to claim 11 further comprising damping means operatively associated with the hook member.

13. The locking hinge assembly according to claim 11 further comprising spring means operatively associated with the hook member.

14. The locking hinge assembly according to claim 11 further comprising means to move the hook member into engagement with the pivot shaft as the assembly moves into the closed position.

15. The locking hinge assembly according to claim 14 wherein the means to move the hook member into engagement with the pivot shaft comprises a cam portion formed on the first link which contacts the hook member as the assembly moves into the closed position.

16. The locking hinge assembly according to claim 11 further comprising a guide ramp member located on the stationary fitting member and located so as to bear against the pivot shaft when engaged by the hook member.

17. The locking hinge assembly according to claim 11 further comprising two second links, one second link disposed on each side of the first link.

18. The locking hinge assembly according to claim 11 further comprising a clevis member fixedly attached to the movable member and pivotally attached to the second ends of the first and the at least one second links.

19. The locking hinge assembly according to claim 11 further comprising stop means located on the stationary fitting member so as to limit the movement of the at least one second link in the open position.

20. A locking hinge assembly for pivotally attaching a movable member to a stationary member such that the movable member is movable between closed and open positions comprising:
 a) a stationary fitting member associated with the stationary member;
 b) a first link having a first end portion pivotally attached to the stationary fitting member so as to pivot about a first pivot axis and a second end;
 c) at least one second link having a first end portion pivotally attached to the stationary fitting member so as to pivot about a second pivot axis displaced from the first pivot axis, and a second end;
 d) means pivotally attaching the second ends of the first and the at least one second links to the movable member so as to pivot about third and fourth pivot axes, respectively, the links, the movable member and the stationary fitting forming a quadrilateral with the four pivot axes as apices;
 e) a clevis member fixedly attached to the movable member and pivotally attached to the second ends of the first and the at least one second links; and,
 f) locking means operatively associated with the stationary fitting member and at least one of the links to lock the assembly in the closed position wherein the locking means comprises a hook member movably supported on the stationary fitting member.

21. The locking hinge assembly according to claim 20 further comprising damping means operatively associated with the hook member.

22. The locking hinge assembly according to claim 20 further comprising spring means operatively associated with the hook member.

23. The locking hinge assembly according to claim 20 wherein the means pivotally attaching the second end of the at least one second link to the movable member comprises a pivot shaft.

24. The locking hinge assembly according to claim 23 wherein the hook member movably supported on the stationary fitting member is located so as to engage the pivot shaft and thereby retain the assembly in the closed position.

25. The locking hinge assembly according to claim 24 further comprising means to move the hook member into engagement with the pivot shaft as the assembly moves into the closed position.

26. The locking hinge assembly according to claim 25 wherein the means to move the hook member into engagement with the pivot shaft comprises a cam portion formed on the first link which contacts the hook member as the assembly moves into the closed position.

27. The locking hinge assembly according to claim 24 further comprising a guide ramp member located on the stationary fitting member and located so as to bear against the pivot shaft when engaged by the hook member.

28. The locking hinge assembly according to claim 20 further comprising two second links, one second link disposed on each side of the first link.

29. The locking hinge assembly according to claim 20 further comprising stop means located on the stationary fitting member so as to limit the movement of the at least one second link in the open position.

* * * * *